(12) United States Patent
Zhao et al.

(10) Patent No.: US 11,785,212 B2
(45) Date of Patent: Oct. 10, 2023

(54) MODE LIST GENERATION FOR MULTI-LINE INTRA PREDICTION

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/356,749

(22) Filed: Jun. 24, 2021

(65) Prior Publication Data
US 2021/0329231 A1 Oct. 21, 2021

Related U.S. Application Data

(63) Continuation of application No. 16/511,626, filed on Jul. 15, 2019, now Pat. No. 11,095,885.

(Continued)

(51) Int. Cl.
H04N 19/11 (2014.01)
H04N 19/105 (2014.01)
(Continued)

(52) U.S. Cl.
CPC .......... H04N 19/11 (2014.11); H04N 19/105 (2014.11); H04N 19/159 (2014.11); H04N 19/176 (2014.11)

(58) Field of Classification Search
None
See application file for complete search history.

(56) References Cited

U.S. PATENT DOCUMENTS 9,154,796 B2 10/2015 Seregin et al.
9,319,683 B2 4/2016 Lim et al.
(Continued)

FOREIGN PATENT DOCUMENTS

EP 3 769 508 1/2021
WO 2020/117905 A1 6/2020

OTHER PUBLICATIONS

Chen et al., Algorithm Description of Joint Exploration Test Model 3, Joint Video Exploration Team (JVET) of ITU-T SG 16 WP 3 and ISO/IEC JTC 1/SC 29/WG 11 3rd Meeting: Geneva, CH, May 26-Jun. 1, 2016, JVET-C1001_v3, pp. 6-7 (Year: 2016).*

(Continued)

Primary Examiner — Mohammad J Rahman
(74) Attorney, Agent, or Firm — Sughrue Mion, PLLC

(57) ABSTRACT

A method of signaling an intra prediction mode used to encode a current block in an encoded video bitstream includes generating a first most probable mode (MPM) list corresponding to a zero reference line of the current block, wherein the first MPM list includes a first plurality of intra prediction modes; generating a second MPM list corresponding to one or more non-zero reference lines of the current block, wherein the second MPM list includes a second plurality of intra prediction modes, the second plurality of intra prediction modes including a subset of the first plurality of intra prediction modes; signaling a reference line index indicating a reference line used to encode the current block; and signaling an intra mode index indicating the intra prediction mode from among the first MPM list and the second MPM list.

17 Claims, 9 Drawing Sheets

Related U.S. Application Data

(60) Provisional application No. 62/742,252, filed on Oct. 5, 2018.

(51) Int. Cl.
*H04N 19/159* (2014.01)
*H04N 19/176* (2014.01)

(56) References Cited

U.S. PATENT DOCUMENTS

| | | | |
|---|---|---|---|
| 9,374,582 | B2 | 6/2016 | Oh et al. |
| 2017/0310986 | A1 | 10/2017 | Lin et al. |
| 2017/0347103 | A1 | 11/2017 | Yu et al. |
| 2017/0353730 | A1* | 12/2017 | Liu ............... H04N 19/159 |
| 2018/0160113 | A1* | 6/2018 | Jeong ............ H04N 19/176 |
| 2018/0288425 | A1 | 10/2018 | Panusopone et al. |
| 2018/0332284 | A1 | 11/2018 | Liu et al. |
| 2019/0116381 | A1* | 4/2019 | Lee ............... H04N 19/159 |
| 2019/0158828 | A1* | 5/2019 | Chang ............ H04N 19/157 |
| 2019/0208195 | A1* | 7/2019 | Chang ............ H04N 19/136 |
| 2019/0373285 | A1* | 12/2019 | Vanam ........... H04N 19/593 |
| 2019/0379891 | A1 | 12/2019 | Moon et al. |
| 2020/0120336 | A1* | 4/2020 | Racape ........... H04N 19/91 |
| 2020/0195920 | A1* | 6/2020 | Racape ........... H04N 19/70 |
| 2020/0322601 | A1 | 10/2020 | Ko et al. |
| 2021/0344929 | A1* | 11/2021 | Choi ............... H04N 19/157 |
| 2022/0030226 | A1* | 1/2022 | Lee ............... H04N 19/117 |

OTHER PUBLICATIONS

International Search Report dated Dec. 17, 2019, issued by the International Searching Authority in International Application No. PCT/US19/53769.
Written Opinion dated Dec. 17, 2019, issued by the International Searching Authority in International Application No. PCT/US19/53769.
Bross et al., Algorithm Description of Joint Exploration Test Model 3, Joint Video Exploration Team (JVET) of ITU-T SG 16 WP 3 and ISO/IEC JTC 1/SC 29/WG 11 11th Meeting: Ljubljana, SI, Jul. 10-18, 2018, JVET-K0051-v1, entire document. (Year: 2018).
Jiang et al., CE3-related: Advanced MPM based on intra reference line selection scheme, Joint Video Exploration Team (JVET) of ITU-T SG 16 WP 3 and ISO/IEC JTC 1/SC 29/WG 11 11th Meeting: Ljubljana, SI, Jul. 10-18, 2018, JVET-K0175-v1, entire document. (Year: 2018).
Zhao et al., CE3-related: MPM based multi-line intra prediction scheme, Joint Video Exploration Team (JVET) of ITU-T SG 16 WP 3 and ISO/IEC JTC 1/SC 29/WG 11 11th Meeting: Ljubljana, SI, Jul. 10-18, 2018, JVET-K0482_r1, entire document. (Year: 2018).
Lin et al., Multiple reference line intra prediction based on JEM7.0, Joint Video Exploration Team (JVET) of ITU-T SG 16 WP 3 and ISO/IEC JTC 1/SC 29/WG 11 10th Meeting: San Diego, US, Apr. 10-20, 2018, JVET-J0070, entire document. (Year: 2018).
Bross, et al., CE3: Multiple reference line intra prediction (Test 5.4.1, 5.4.2, 5.4.3 and 5.4.4), Joint Video Experts Team (JVET) of ITU-T SG 16 WP 3 and ISO/IEC JTC 1/SC 29/WG 11 11th Meeting: Ljubljana, SI, Jul. 10-18, 2018, Document: JVET-K0051-v1 (Year: 2018).
Rath, CE3.5: Multiple Reference Intra Prediction (tests 5.2.1 and 5.2.2), Joint Video Experts Team (JVET) of ITU-T SG 16 WP 3 and ISO/IEC JTC 1/SC 29/WG 11 11th Meeting: Ljubljana, SI, Jul. 10-18, 2018 Document: JVET-K0162 (Year: 2018).
Albrecht, Description of SDR, HDR, and 360° video coding technology proposal by Fraunhofer HHI, Joint Video Experts Team (JVET) of ITU-T SG 16 WP 3 and ISO/IEC JTC 1/SC 29/WG 11 10th Meeting: San Diego, US, Apr. 10-20, 2018 Document: JVET-J0014-v4 (Year: 2018).
Lin, CE3: Number of extended reference line for intra prediction (Test 5.5.1 and 5.5.2), Joint Video Exploration Team (JVET) of ITU-T SG 16 WP 3 and ISO/IEC JTC 1/SC 29/WG 11 11th Meeting: Ljubljana, SI, Jul. 10-18, 2018 Document: JVET-K0277 (Year: 2018).
Bross, CE3-related: On the combination of multiple reference lines, bilateral reference line filtering, PDPC and 65 directional modes for intra predict, Joint Video Experts Team (JVET) of ITU-T SG 16 WP 3 and ISO/IEC JTC 1/SC 29/WG 11 11th Meeting: Ljubljana, SI, Jul. 10-18, 2018 Document: JVET-K0348-v3 (Year: 2018).
Extended European Search Report dated May 3, 2022 in European Application No. 19869423.4.
Ling Li et al., "CE3-related: Harmonization on MPM list", Joint Video Experts Team (JVET) of ITU-T SG 16 WP 3 and ISO/IEC JTC 1/SC 29/WG11, Document: JVET-M0815-v2, 2019 (2 pages total).
Liang Zhao et al., "CE3-related: MPM based multi-line intra prediction scheme", Joint Video Exploration Team (JVET) of ITU-T SG 16 WP 3 and ISO/IEC JTC 1/SC 29/WG 11, JVET-K0482_r1, Jul. 10-18, 2018, 11th Meeting: Ljubljana, SI, pp. 1-3 (3 pages total).

* cited by examiner

FIG. 1 -PRIOR ART-

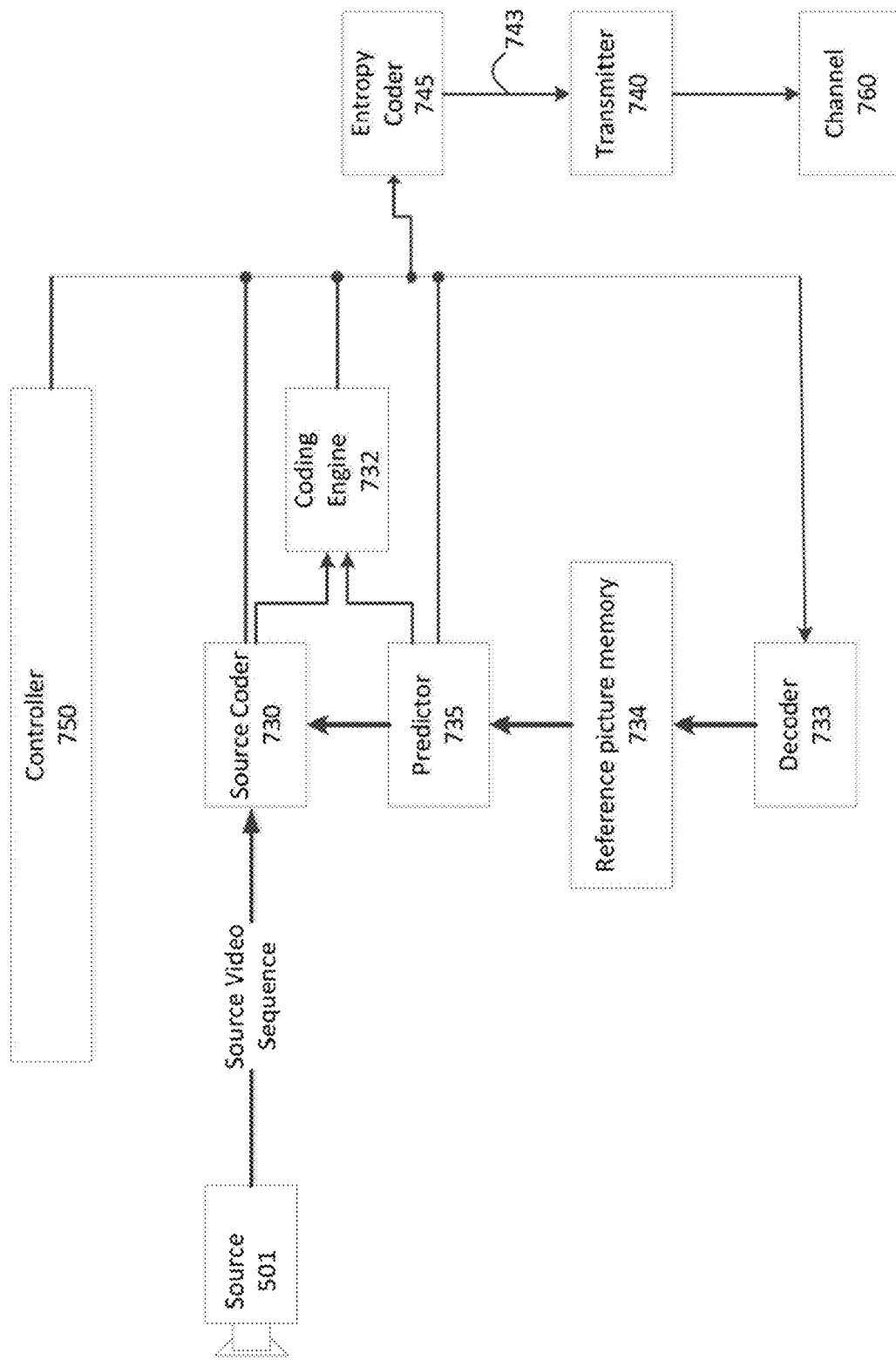
FIG. 7  Encoder 503

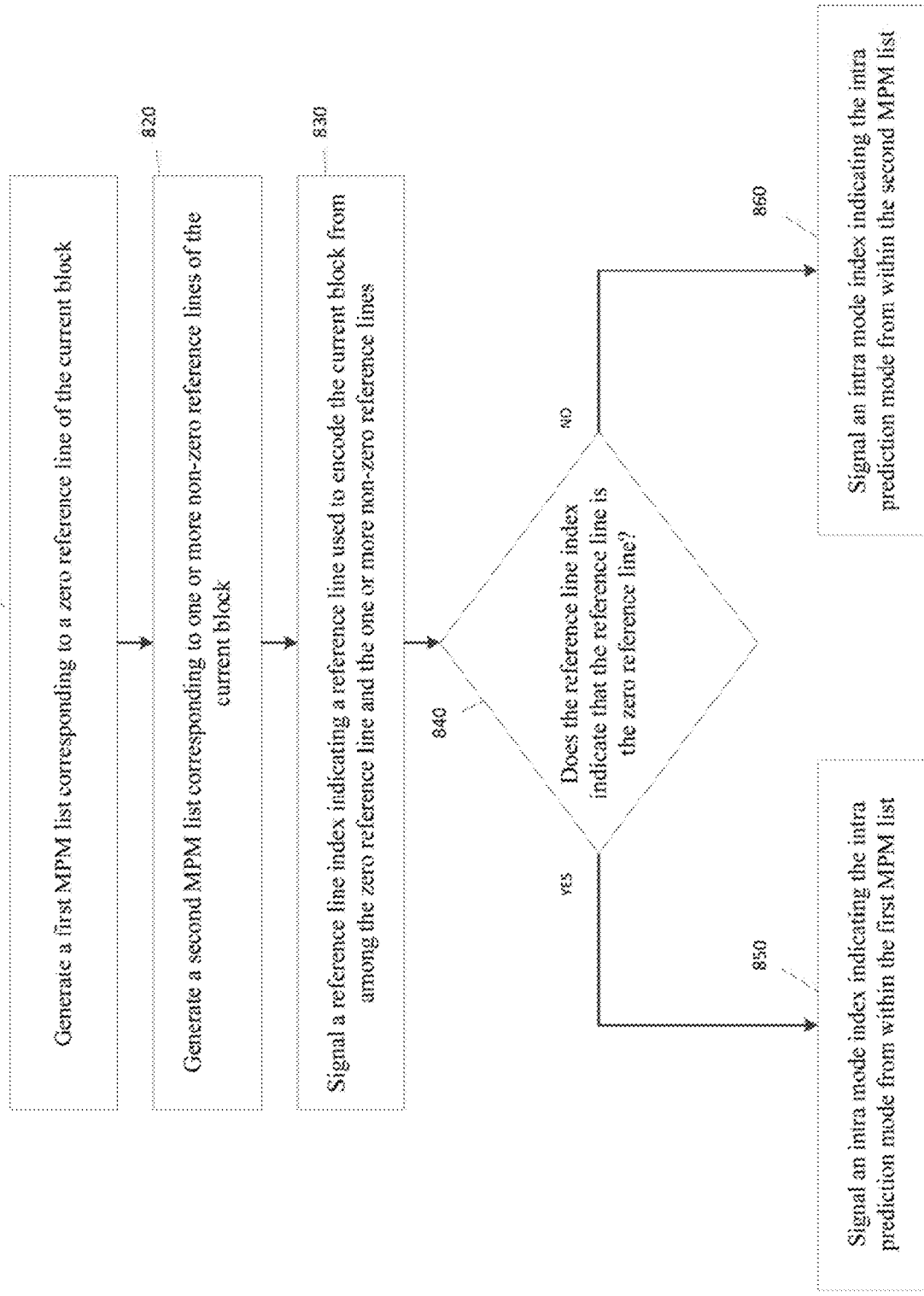

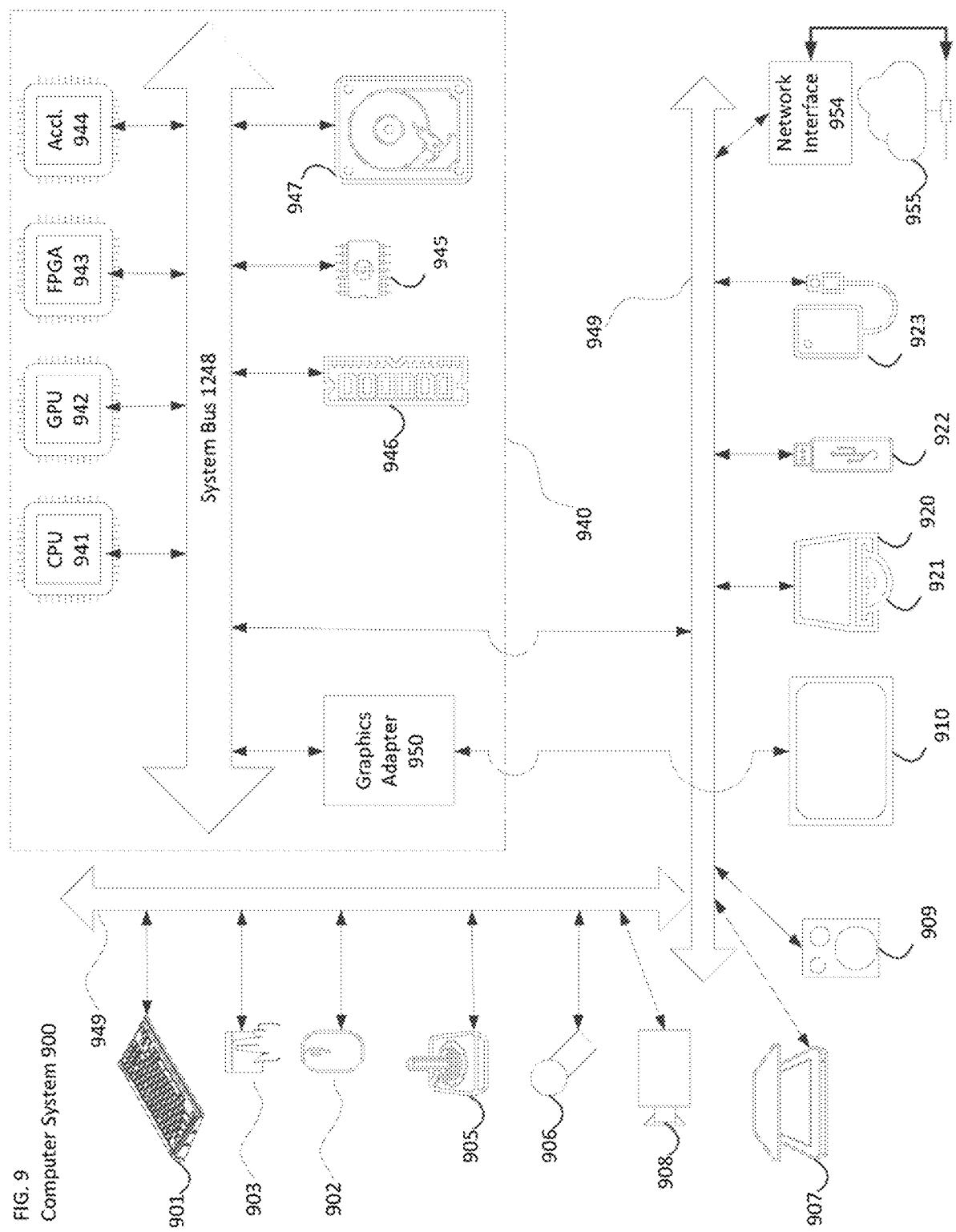

MODE LIST GENERATION FOR MULTI-LINE INTRA PREDICTION

CROSS-REFERENCE TO RELATED APPLICATION

This application is a continuation of U.S. application Ser. No. 16/511,626, filed on Jul. 15, 2019, in the United States Patent & Trademark Office, which claims priority from 35 U.S.C. § 119 to U.S. Provisional Application No. 62/742, 252, filed on Oct. 5, 2018, in the United States Patent & Trademark Office, the disclosures of which are incorporated herein by reference in their entireties.

FIELD

The present disclosure is directed to advanced video coding technologies. More specifically, the present disclosure is directed to a mode list generation scheme for multi-line intra prediction.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4) [1]. In 2015, these two standard organizations jointly formed the JVET (Joint Video Exploration Team) to explore the potential of developing the next video coding standard beyond HEVC In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

The intra prediction modes used in HEVC are illustrated in FIG. 1. In HEVC, there are total 35 intra prediction modes, among which mode 10 is horizontal mode, mode 26 is vertical mode, and mode 2, mode 18 and mode 34 are diagonal modes. The intra prediction modes are signalled by three most probable modes (MPMs) and 32 remaining modes.

To code an intra mode, a most probable mode (MPM) list of size 3 is built based on the intra modes of the neighboring blocks. this MPM list will be referred to as the MPM list or primary MPM list. If intra mode is not from the MPM list, a flag is signalled to indicate whether intra mode belongs to the selected modes.

An example of the MPM list generation process for HEVC is shown is follows:

```
If (leftIntraDir == aboveIntraDir && leftIntraDir > DC_IDX)
    MPM [0] = leftIntraDir;
    MPM [1] = ((leftIntraDir + offset) % mod) + 2;
    MPM [2] = ((leftIntraDir - 1) % mod) + 2;
Else if (leftIntraDir == aboveIntraDir)
    MPM [0] = PLANAR_IDX;
    MPM [1] = DC_IDX;
    MPM [2] = VER_IDX;
Else if (leftIntraDir != aboveIntraDir)
    MPM [0] = leftIntraDir;
    MPM [1] = aboveIntraDir;
    If (leftIntraDir > 0 && aboveIntraDir > 0)
        MPM [2] = PLANAR_IDX;
    Else
        MPM [2] = (leftIntraDir + aboveIntraDir) < 2 ? VER_IDX: DC_IDX;
```

Here, leftIntraDir is used to indicate the mode in left block and aboveIntraDir is used to indicate the mode in the above block. If left or block is currently not available, leftIntraDir or aboveIntraDir will be to DC_IDX. In addition, variable "offset" and "mod" are the constant values, which are set to 29 and 32 respectively.

Multi-line intra prediction was proposed to use more reference lines for intra prediction, and encoder decides and signals which reference line is used to generate the intra predictor. The reference line index is signaled before intra prediction modes, and Planar/DC modes are excluded from intra prediction modes in case a nonzero reference line index is signaled. In FIG. 2, an example of 4 reference lines is depicted, where each reference line is composed of six segments, i.e., Segment A to F, together with the top-left reference sample. In addition, Segment A and F are padded with the closest samples from Segment B and E, respectively.

For multi-line intra prediction, if the available modes for non-zero reference lines is the same with zero reference line, the encoding complexity of multi-line intra prediction is very high. Therefore, the available intra prediction mode number for non-zero reference lines must be reduced.

SUMMARY

In an embodiment, there is provided a method of signaling an intra prediction mode used to encode a current block in an encoded video bitstream using at least one processor, including generating a first most probable mode (MPM) list corresponding to a zero reference line of the current block, wherein the first MPM list includes a first plurality of intra prediction modes; generating a second MPM list corresponding to one or more non-zero reference lines of the current block, wherein the second MPM list includes a second plurality of intra prediction modes, the second plurality of intra prediction modes including a subset of the first plurality of intra prediction modes; signalling a reference line index indicating a reference line used to encode the current block from among the zero reference line and the one or more non-zero reference lines; and signalling an intra mode index indicating the intra prediction mode, wherein based on the reference line index indicating that the reference line is the zero reference line, the intra mode index indicates the intra prediction mode within the first MPM list, and based on the reference line index indicating that the reference line is one from among the one or more non-zero reference lines, the intra mode index indicates the intra prediction mode within the second MPM list.

In an embodiment, there is provided a device for signaling an intra prediction mode used to encode a current block in an encoded video bitstream, including at least one memory configured to store program code; and at least one processor configured to read the program code and operate as instructed by the program code, the program code including: first generating code configured to cause the processor to generate a first most probable mode (MPM) list corresponding to a zero reference line of the current block, wherein the first MPM list includes a first plurality of intra prediction modes; second generating code configured to cause the processor to generate a second MPM list corresponding to one or more non-zero reference lines of the current block, wherein the second MPM list includes a second plurality of intra prediction modes, the second plurality of intra prediction modes including a subset of the first plurality of intra prediction modes; first signaling code configured to cause the processor to signal a reference line index indicating a reference line used to encode the current block from among the zero reference line and the one or more non-zero reference lines; and second signalling code configured to cause the processor to signal an intra mode index indicating the intra prediction mode, wherein based on the reference line index indicating that the reference line is the zero reference line, the intra mode index indicates the intra prediction mode within the first MPM list, and based on the reference line index indicating that the reference line is one from among the one or more non-zero reference lines, the intra mode index indicates the intra prediction mode within the second MPM list.

In an embodiment, there is provided a non-transitory computer-readable medium storing instructions, the instructions including one or more instructions that, when executed by one or more processors of a device for signaling an intra prediction mode used to encode a current block in an encoded video bitstream, cause the one or more processors to: generate a first most probable mode (MPM) list corresponding to a zero reference line of the current block, wherein the first MPM list including a first plurality of intra prediction modes; generate a second MPM list corresponding to one or more non-zero reference lines of the current block, wherein the second MPM list including a second plurality of intra prediction modes, the second plurality of intra prediction modes including a subset of the first plurality of intra prediction modes; signal a reference line index indicating a reference line used to encode the current block from among the zero reference line and the one or more non-zero reference lines; and signal an intra mode index indicating the intra prediction mode, wherein based on the reference line index indicating that the reference line is the zero reference line, the intra mode index indicates the intra prediction mode within the first MPM list, and based on the reference line index indicating that the reference line is one from among the one or more non-zero reference lines, the intra mode index indicates the intra prediction mode within the second MPM list . . .

BRIEF DESCRIPTION OF THE DRAWINGS

Further features, the nature, and various advantages of the disclosed subject matter will be more apparent from the following detailed description and the accompanying drawings in which:

FIG. 7 is a functional block diagram of a video encoder according to an embodiment.

FIG. 8 is a flowchart of an example process for signaling an intra prediction mode used to encode a current block in an encoded video bitstream according to an embodiment.

FIG. 9 is a diagram of a computer system according to an embodiment.

DETAILED DESCRIPTION

Figure 1:
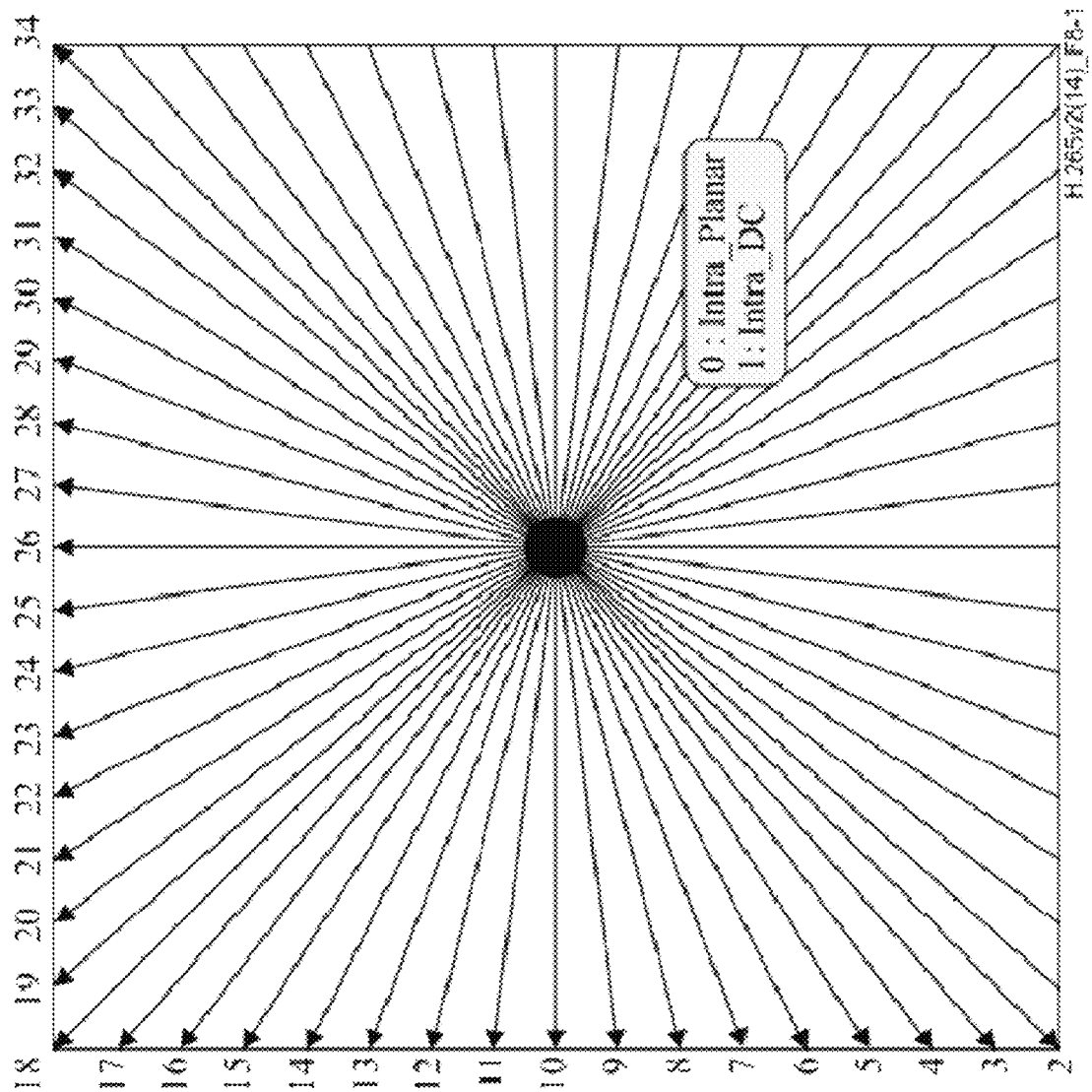
FIG. 1 is a diagram of an example of intra prediction modes in HEVC.
Figure 2:
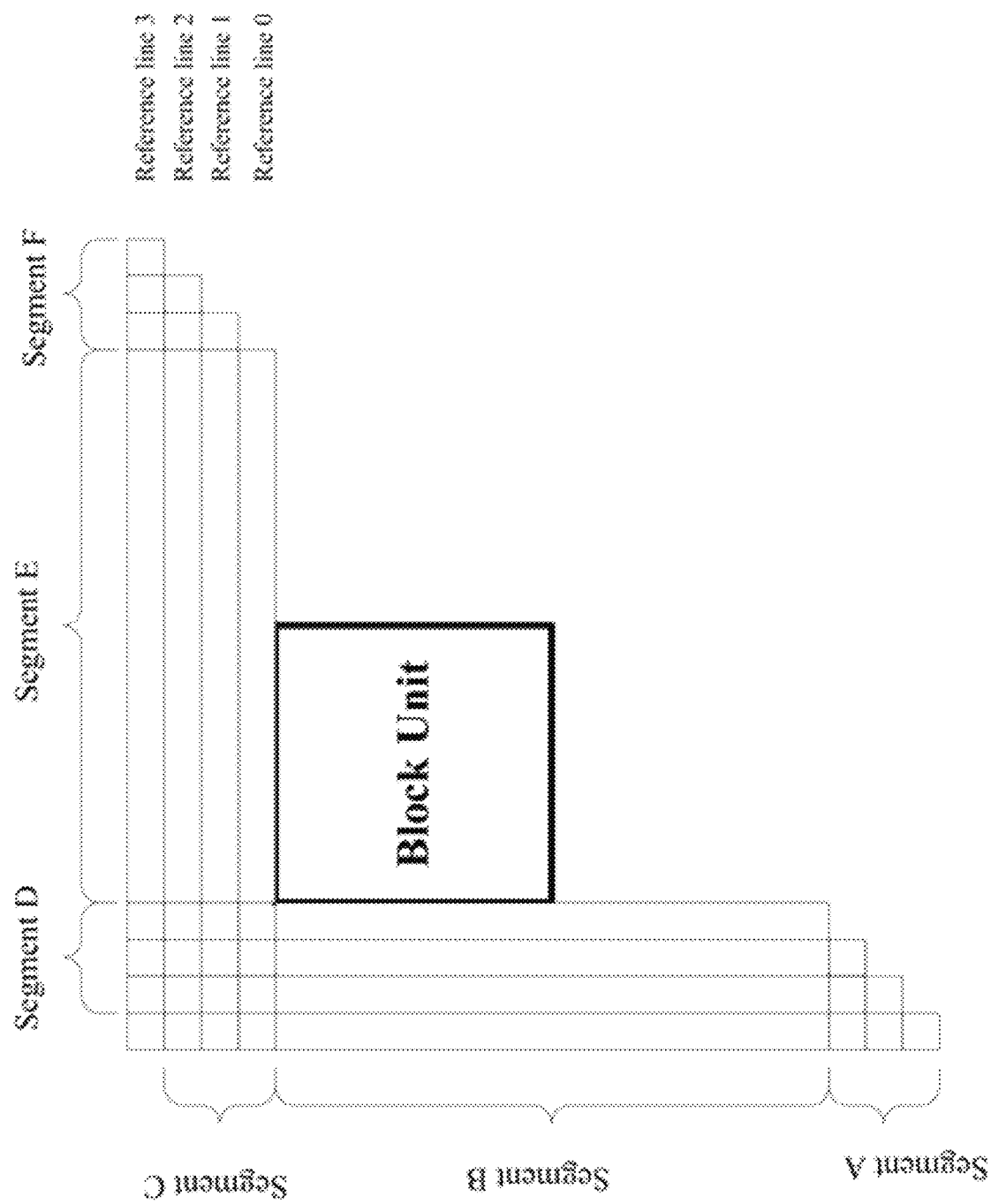
FIG. 2 is a diagram showing an example of reference lines adjacent to a coding block unit.
Figure 3:
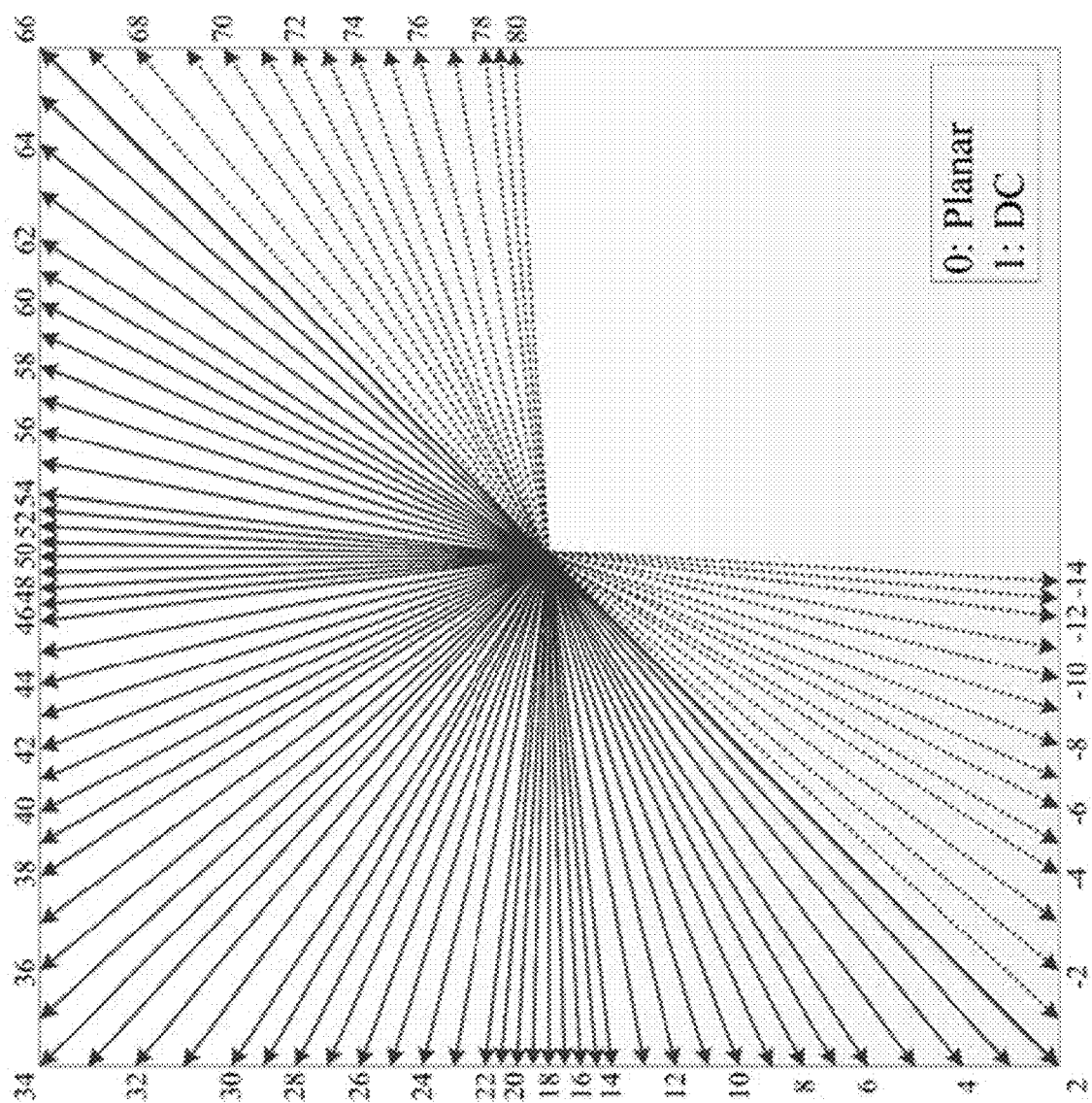
FIG. 3 is a diagram of an example of intra prediction modes in VVC.

In VVC, there may be a total of 95 intra prediction modes as shown in FIG. 3, where mode 18 is horizontal mode, mode 50 is vertical mode, and mode 2, mode 34 and mode 66 are diagonal modes. Modes-1 through -10 and modes 67 through 76 may be called Wide-Angle Intra Prediction (WAIP) modes.

In VTM2.0.1, the size of MPM list is 3 and the MPM list generation process is the same with HEVC. One difference is that "offset" is changed to 61 and "mod" is changed to 64 since there are 67 signaled modes in VTM2.0.1.

The following clause may describe luma intra mode coding process:

IntraPredModeY[xPb][yPb] may be derived by the following ordered steps:

1. The neighbouring locations (xNbA, yNbA) and (xNbB, yNbB) are set equal to (xPb−1, yPb) and (xPb, yPb−1), respectively.
2. For X being replaced by either A or B, the variables candIntraPredModeX are derived as follows:

The availability derivation process for a block as specified in clause 6.4.X [Ed. (BB): Neighbouring blocks availability checking process tbd] is invoked with the location (xCurr, yCurr) set equal to (xPb, yPb) and the neighbouring location (xNbY, yNbY) set equal to (xNbX, yNbX) as inputs, and the output is assigned to availableX.

The candidate intra prediction mode candIntraPredModeX is derived as follows:

If one or more of the following conditions are true, candIntraPredModeX is set
  equal to INTRA_DC.
    The variable availableX is equal to FALSE.
    CuPredMode[ xNbX ][ yNbX ] is not equal to MODE_INTRA.
    X is equal to B and yPb − 1 is less than
      ( ( yPb >> CtbLog2SizeY ) << CtbLog2SizeY ).
Otherwise, candIntraPredModeX is set equal to
  IntraPredModeY[ xNbX ][ yNbX ].

3. The candModeList[x] with x=0..2 is derived as follows:

If candIntraPredModeB is equal to candIntraPredModeA,
the following applies:
  If candIntraPredModeA is less than 2 (i.e., equal to
  INTRA_PLANAR or INTRA_DC), candModeList[ x ]
  with x = 0..2 is derived as follows:
    candModeList[ 0 ] = INTRA_PLANAR
    candModeList[ 1 ] = INTRA_DC
    candModeList[ 2 ] = INTRA_ANGULAR50
  Otherwise, candModeList[ x ] with x = 0..2 is derived as follows:
    candModeList[ 0 ] = candIntraPredModeA
    candModeList[ 1 ] = 2 + ( ( candIntraPredModeA + 61) % 64)
    candModeList[ 2 ] = 2 + ( ( candIntraPredModeA − 1) % 64)
Otherwise (candIntraPredModeB is not equal to candIntraPredModeA), -continued the following applies:
  candModeList[ 0 ] and candModeList[ 1 ] are derived as follows:
    candModeList[ 0 ] = candIntraPredModeA
    candModeList[ 1 ] = candIntraPredModeB
  If neither of candModeList[ 0 ] and candModeList[ 1 ] is equal to
  INTRA_PLANAR, candModeList[ 2 ] is set equal to
  INTRA_PLANAR,
  Otherwise, if neither of candModeList[ 0 ] and candModeList[ 1 ]
  is equal to INTRA_DC, candModeList[ 2 ] is set equal to
  INTRA_DC,
  Otherwise, candModeList[ 2 ] is set equal to INTRA_ANGULAR50.

4. IntraPredModeY[xPb][yPb] is derived by applying the following procedure:

If intra_luma_mpm_flag[ xPb ] [ yPb ] is equal to 1, the IntraPredModeY[ xPb ][ yPb ] is
set equal to candModeList[ intra_luma_mpm_idx[ xPb ][ yPb ] ].
Otherwise, IntraPredModeY[ xPb ][y Pb ] is derived by applying the following ordered
steps:
  1. The array candModeList[ x ], x = 0..2 is modified by the following ordered steps:
    i. When candModeList[ 0 ] is greater than candModeList[ 1 ], both values are
      swapped as follows:
      ( candModeList[ 0 ], candModeList[ 1 ] ) = Swap( candModeList[ 0 ],
      candModeList[ 1 ] )
    ii. When candModeList[ 0 ] is greater than candModeList[ 2 ], both values are
      swapped as follows:
      ( candModeList[ 0 ], candModeList[ 2 ] ) = Swap( candModeList[ 0 ],
      candModeList[ 2 ] )
    iii. When candModeList[ 1 ] is greater than candModeList[ 2 ], both values are
      swapped as follows:
      ( candModeList[ 1 ], candModeList[ 2 ] ) = Swap( candModeList[ 1 ],
      candModeList[ 2 ] )
  2. IntraPredModeY[ xPb ][ yPb ] is derived by the following ordered steps:
    i. IntraPredModeY[ xPb ][ yPb ] is set equal to
      intra_luma_mpm_remaindwe[ xPb ][ yPb ].
    ii. For i equal to 0 to 2, inclusive, when IntraPredModeY[ xPb ]
      [ y Pb ] is greater than or equal to candModeList[ i ], the value of
      IntraPredModeY[ xPb][ yPb ] is incremented by one.

The variable IntraPredModeY[x][y] with x=xPb ... xPb+cbWidth−1 and y=yPb ... yPb+cbHeight−1 is set to be equal to IntraPredModeY[xPb][yPb].

In the development of VVC, an MPM list with size of 6 has been proposed. Planar and DC modes may be always included in the MPM list. Two neighboring modes, left and above modes, may be used to generate the remaining 4 MPM.

In VTM4.0, the size of MPM list is extended to 6. When intra_luma_mpm_flag is true, it indicates that current mode belongs to the candidates in MPM list. Consider Table 1 below:

TABLE 1

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |

TABLE 1-continued

|  | Descriptor |
|---|---|
|   if( cu_skip_flag[ x0 ][ y0 ] = = 0 && tile_group_type != I )<br>    pred_mode_flag<br>  if( ( ( tile_group_type = = I && cu_skip_flag[ x0 ][ y0 ] = =0 ) \|\|<br>    ( tile_group_type != I && CuPredMode[ x0 ][ y0 ] != MODE_INTRA ) ) &&<br>    sps_ibc_enabled_flag )<br>    pred_mode_ibc_flag<br>}<br>if( CuPredMode[ x0 ][ y0 ] = = MODE_INTRA ) {<br>  if( sps_pcm_enabled_flag &&<br>    cbWidth >= MinIpcmCbSizeY && cbWidth <= MaxIpcmCbSizeY &&<br>    cbHeight >= MinIpcmCbSizeY && cbHeight <= MaxIpcmCbSizeY )<br>    pcm_flag[ x0 ][ y0 ]<br>  if( pcm_flag[ x0 ][ y0 ] ) {<br>    while( !byte_aligned( ) )<br>      pcm_alignment_zero_bit<br>    pcm_sample( cbWidth, cbHeight, treeType)<br>  } else {<br>    if( treeType = = SINGLE_TREE \|\| treeType = = DUAL_TREE_LUMA ) {<br>      if( ( y0 % CtbSizeY ) > 0 )<br>        intra_luma_ref_idx[ x0 ][ y0 ]<br>      if (intra_luma_ref_idx[ x0 ][ y0 ] = = 0 &&<br>        ( cbWidth <= MaxTbSizeY \|\| cbHeight <= MaxTbSizeY ) &&<br>        ( cbWidth * cbHeight > MinTbSizeY * MinTbSizeY ))<br>        intra_subpartitions_mode_flag[ x0 ][ y0 ]<br>      if( intra_subpartitions_mode_flag[ x0 ][ y0 ] = = 1 &&<br>        cbWidth <= MaxTbSizeY && cbHeight <= MaxTbSizeY )<br>        intra_subpartitions_split_flag[ x0 ][ y0 ]<br>      if( intra_luma_ref_idx[ x0 ][ y0 ] = = 0 &&<br>        intra_subpartitions_mode_flag[ x0 ][ y0 ] = = 0 )<br>        intra_luma_mpm_flag[ x0 ][ y0 ]<br>      if( intra_luma_mpm_flag[ x0 ][ y0 ] )<br>        intra_luma_mpm_idx[ x0 ][ y0 ]<br>      else<br>        intra_luma_mpm_remainder[ x0 ][ y0 ]<br>    }<br>    if( treeType = = SINGLE_TREE \|\| treeType = = DUAL_TREE_CHROMA )<br>      intra_chroma_pred_mode[ x0 ][ y0 ]<br>  }<br>} | ae(v)<br><br><br><br><br>ae(v)<br><br><br><br><br>ae(v)<br><br><br>f(1)<br><br><br><br>ae(v)<br><br><br><br>ae(v)<br><br><br>ae(v)<br><br>ae(v)<br><br>ae(v)<br><br>ae(v)<br><br><br>ae(v) |

Figure 4:
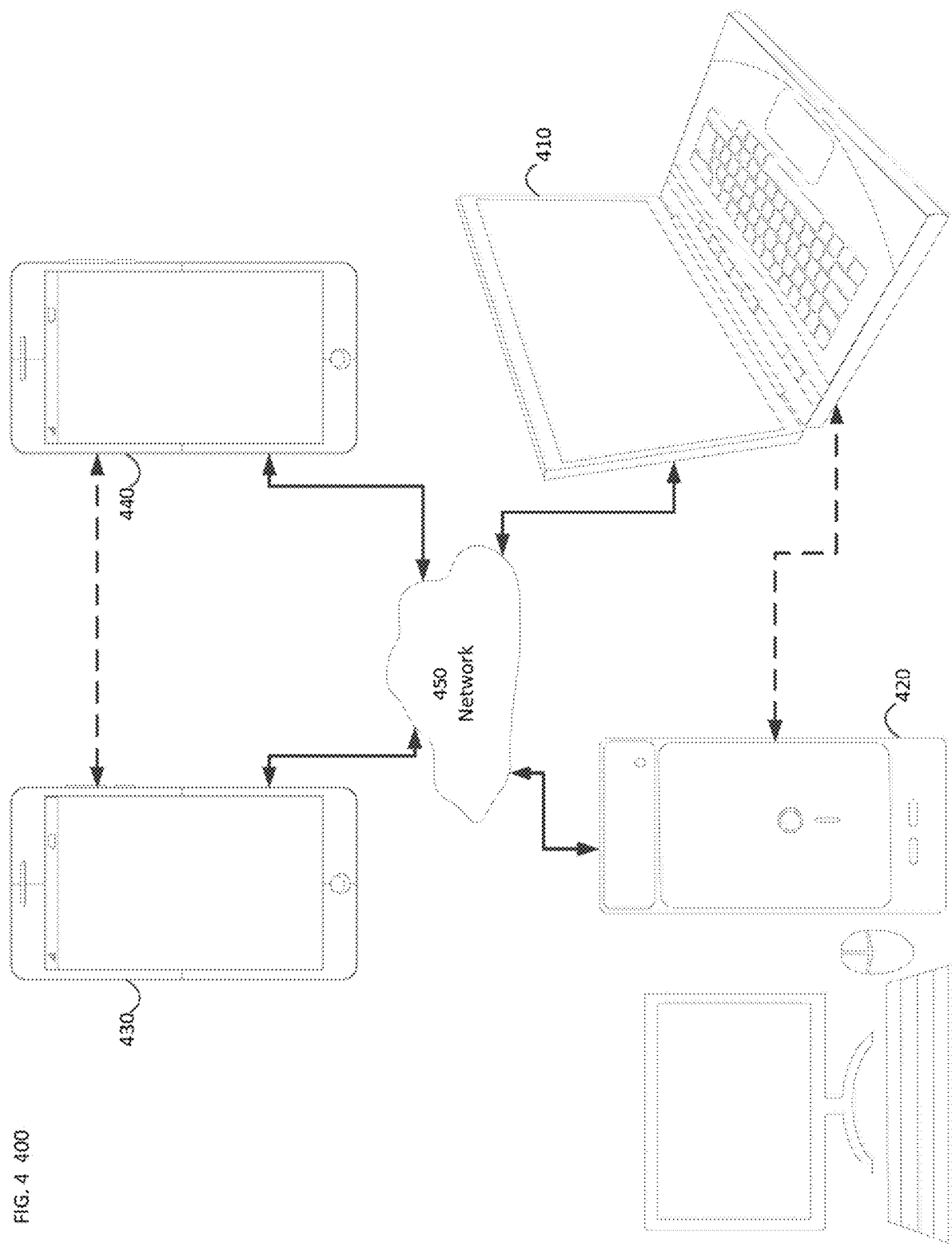
FIG. 4 is a simplified block diagram of a communication system according to an embodiment.

FIG. 4 illustrates a simplified block diagram of a communication system (300) according to an embodiment of the present disclosure. The communication system (300) may include at least two terminals (410-420) interconnected via a network (450). For unidirectional transmission of data, a first terminal (410) may code video data at a local location for transmission to the other terminal (420) via the network (450). The second terminal (420) may receive the coded video data of the other terminal from the network (450), decode the coded data and display the recovered video data. Unidirectional data transmission may be common in media serving applications and the like.

FIG. 4 illustrates a second pair of terminals (430, 440) provided to support bidirectional transmission of coded video that may occur, for example, during videoconferencing. For bidirectional transmission of data, each terminal (430, 440) may code video data captured at a local location for transmission to the other terminal via the network (450). Each terminal (430, 440) also may receive the coded video data transmitted by the other terminal, may decode the coded data and may display the recovered video data at a local display device.

In FIG. 4, the terminals (410-440) may be illustrated as servers, personal computers and smart phones but the principles of the present disclosure are not so limited. Embodiments of the present disclosure find application with laptop computers, tablet computers, media players and/or dedicated video conferencing equipment. The network (450) represents any number of networks that convey coded video data among the terminals (410-440), including for example wireline and/or wireless communication networks. The communication network (450) may exchange data in circuit-switched and/or packet-switched channels. Representative networks include telecommunications networks, local area networks, wide area networks and/or the Internet. For the purposes of the present discussion, the architecture and topology of the network (450) may be immaterial to the operation of the present disclosure unless explained herein below.

Figure 5:
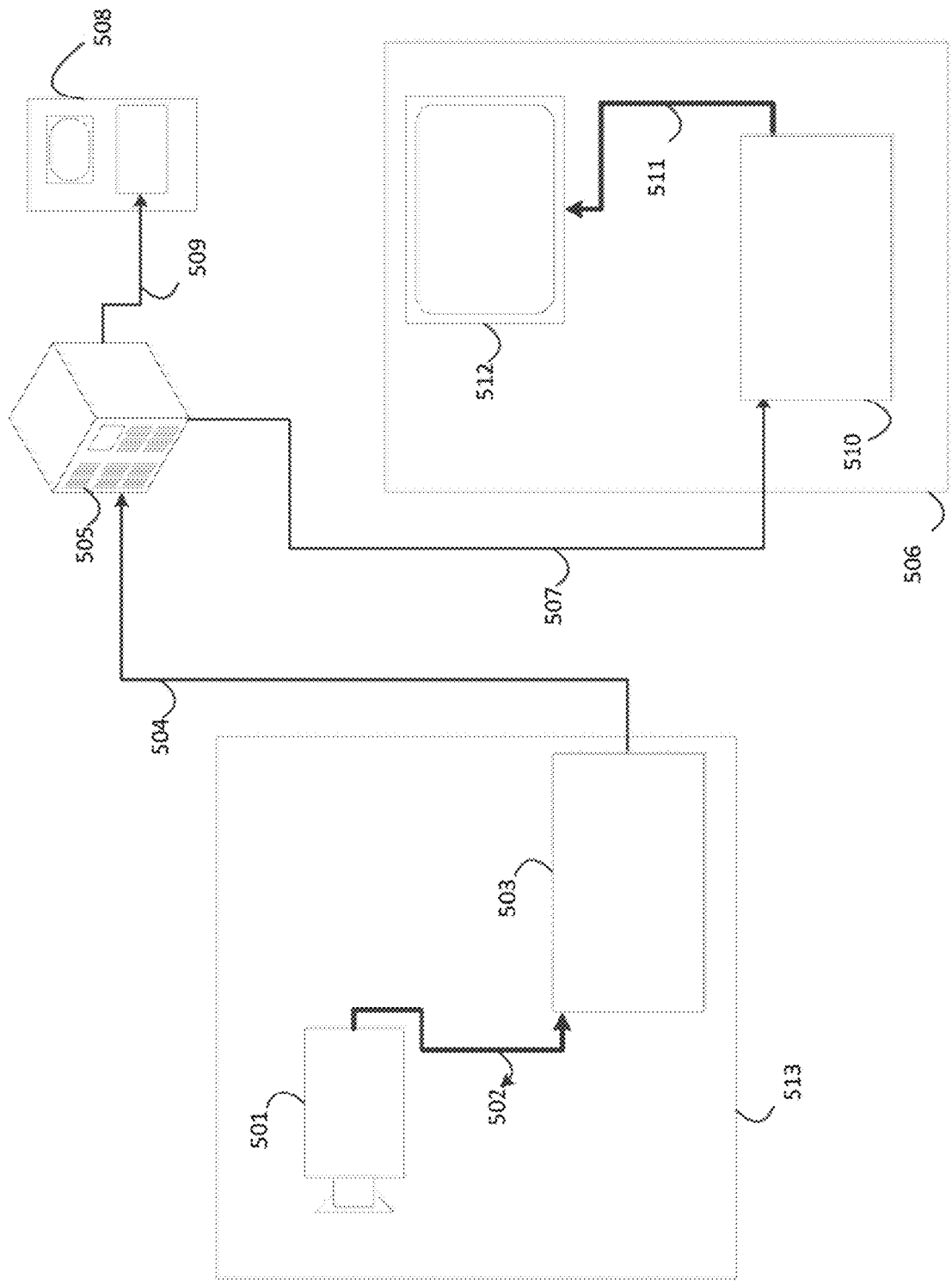
FIG. 5 is a diagram of the placement of a video encoder and decoder in a streaming environment according to an embodiment.

FIG. 5 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (513), that can include a video source (501), for example a digital camera, creating, for example, an uncompressed video sample stream (502). That sample stream (502), depicted as a bold line to emphasize a high data volume when compared to encoded video bitstreams, can be processed by an encoder (503) coupled to the camera 501). The encoder (503) can include hardware, software, or a combination thereof to enable or implement aspects of the disclosed subject matter as described in more detail below. The encoded video bitstream (504), depicted as a thin line to emphasize the lower data volume when compared to the sample stream, can be stored on a streaming server (505) for future use. One or more streaming clients (506, 508) can access the streaming server (505) to retrieve copies (507, 509) of the encoded video bitstream (504). A client (506) can include a video decoder (510) which decodes the incoming copy of the encoded video bitstream (507) and creates an outgoing video sample stream (511) that can be rendered on a display (512) or other rendering device (not depicted). In some streaming systems, the video bitstreams (504, 507, 509) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 6:
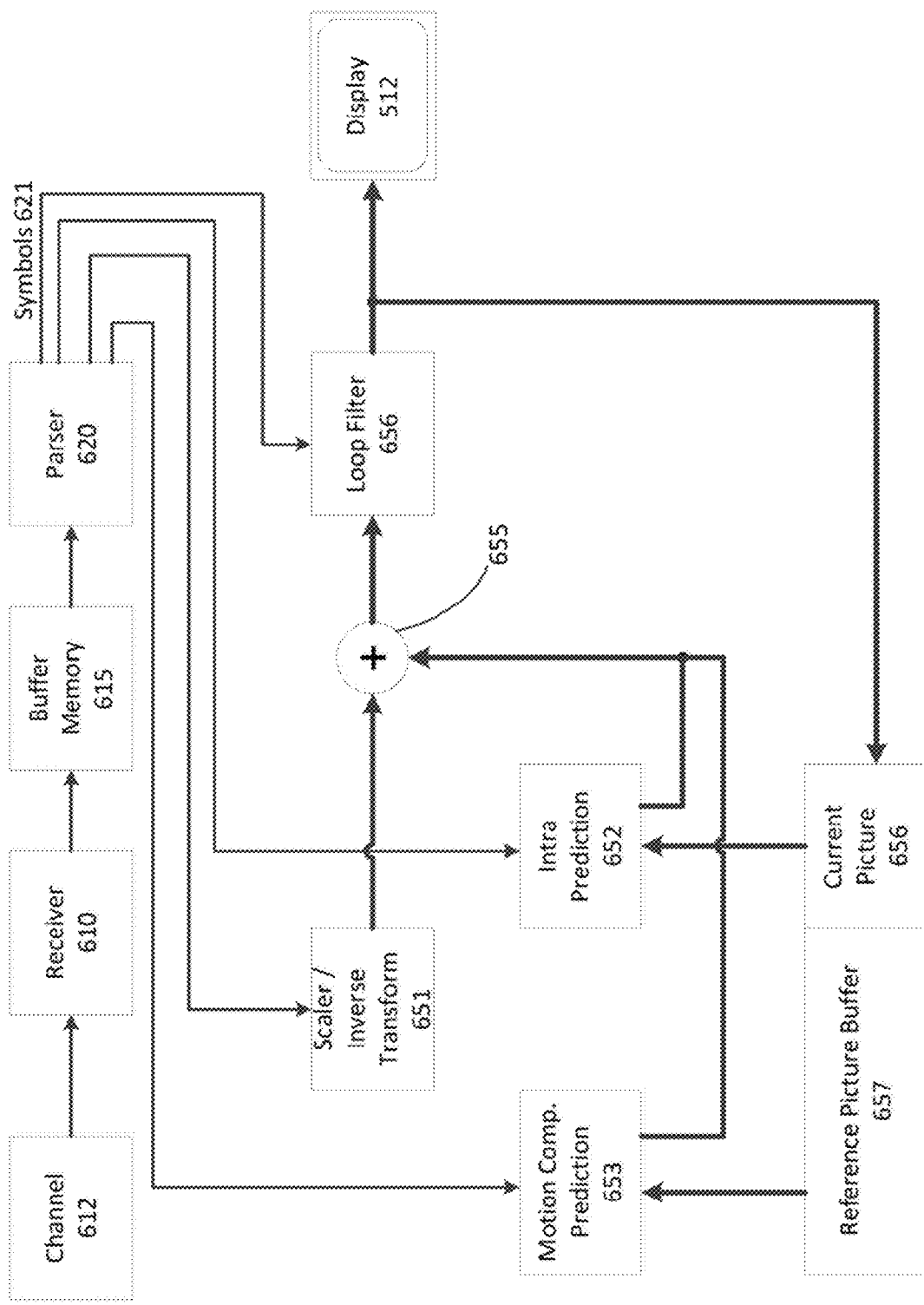
FIG. 6 is a functional block diagram of a video decoder according to an embodiment.

FIG. 6 may be a functional block diagram of a video decoder (510) according to an embodiment of the present invention.

A receiver (610) may receive one or more codec video sequences to be decoded by the decoder (510); in the same or another embodiment, one coded video sequence at a time, where the decoding of each coded video sequence is independent from other coded video sequences. The coded video sequence may be received from a channel (612), which may be a hardware/software link to a storage device which stores the encoded video data. The receiver (610) may receive the encoded video data with other data, for example, coded audio data and/or ancillary data streams, that may be forwarded to their respective using entities (not depicted). The receiver (610) may separate the coded video sequence from the other data. To combat network jitter, a buffer memory (615) may be coupled in between receiver (610) and entropy decoder/parser (620) ("parser" henceforth). When receiver (610) is receiving data from a store/forward device of sufficient bandwidth and controllability, or from an isosynchronous network, the buffer (615) may not be needed, or can be small. For use on best effort packet networks such as the Internet, the buffer (615) may be required, can be comparatively large and can advantageously of adaptive size.

The video decoder (510) may include a parser (620) to reconstruct symbols (621) from the entropy coded video sequence. Categories of those symbols include information used to manage operation of the decoder (510), and potentially information to control a rendering device such as a display (512) that is not an integral part of the decoder but can be coupled to it, as was shown in FIG. 6. The control information for the rendering device(s) may be in the form of Supplementary Enhancement Information (SEI messages) or Video Usability Information (VUI) parameter set fragments (not depicted). The parser (620) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (620) may perform entropy decoding/parsing operation on the video sequence received from the buffer (615), so to create symbols (621). The parser (620) may receive encoded data, and selectively decode particular symbols (621). Further, the parser (620) may determine whether the particular symbols (621) are to be provided to a Motion Compensation Prediction unit (653), a scaler/inverse transform unit (651), an Intra Prediction Unit (652), or a loop filter (656).

Reconstruction of the symbols (621) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (620). The flow of such subgroup control information between the parser (620) and the multiple units below is not depicted for clarity.

Beyond the functional blocks already mentioned, decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (651). The scaler/inverse transform unit (651) receives quantized transform coefficient as well as control information, including which transform to use, block size, quantization factor, quantization scaling matrices, etc. as symbol(s) (621) from the parser (620). It can output blocks comprising sample values, that can be input into aggregator (655).

In some cases, the output samples of the scaler/inverse transform (651) can pertain to an intra coded block; that is: a block that is not using predictive information from previously reconstructed pictures, but can use predictive information from previously reconstructed parts of the current picture. Such predictive information can be provided by an intra picture prediction unit (652). In some cases, the intra picture prediction unit (652) generates a block of the same size and shape of the block under reconstruction, using surrounding already reconstructed information fetched from the current (partly reconstructed) picture (656). The aggregator (655), in some cases, adds, on a per sample basis, the prediction information the intra prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a Motion Compensation Prediction unit (653) can access reference picture memory (657) to fetch samples used for prediction. After motion compensating the fetched samples in accordance with the symbols (621) pertaining to the block, these samples can be added by the aggregator (655) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (621) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (655) can be subject to various loop filtering techniques in the loop filter unit (656). Video compression technologies can include in-loop filter technologies that are controlled by parameters included in the coded video bitstream and made available to the loop filter unit (656) as symbols (621) from the parser (620), but can also be responsive to meta-information obtained during the decoding of previous (in decoding order) parts of the coded picture or coded video sequence, as well as responsive to previously reconstructed and loop-filtered sample values.

The output of the loop filter unit (656) can be a sample stream that can be output to the render device (512) as well as stored in the reference picture memory (656) for use in future inter-picture prediction.

Certain coded pictures, once fully reconstructed, can be used as reference pictures for future prediction. Once a coded picture is fully reconstructed and the coded picture has been identified as a reference picture (by, for example, parser (620)), the current reference picture (656) can become part of the reference picture buffer (657), and a fresh current picture memory can be reallocated before commencing the reconstruction of the following coded picture.

The video decoder (510) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (610) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

FIG. 7 may be a functional block diagram of a video encoder (503) according to an embodiment of the present disclosure.

The encoder (503) may receive video samples from a video source (501) (that is not part of the encoder) that may capture video image(s) to be coded by the encoder (503).

The video source (501) may provide the source video sequence to be coded by the encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (503) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (503) may code and compress the pictures of the source video sequence into a coded video sequence (743) in real time or under any other time constraints as required by the application. Enforcing appropriate coding speed is one function of Controller (750). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (750) as they may pertain to video encoder (503) optimized for a certain system design.

Some video encoders operate in what a person skilled in the art readily recognizes as a "coding loop." As an oversimplified description, a coding loop can consist of the encoding part of an encoder (730) ("source coder" henceforth) (responsible for creating symbols based on an input picture to be coded, and a reference picture(s)), and a (local) decoder (733) embedded in the encoder (503) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (734). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (733) can be the same as of a "remote" decoder (510), which has already been described in detail above in conjunction with FIG. 6. Briefly referring also to FIG. 6, however, as symbols are available and en/decoding of symbols to a coded video sequence by entropy coder (745) and parser (620) can be lossless, the entropy decoding parts of decoder (510), including channel (612), receiver (610), buffer (615), and parser (620) may not be fully implemented in local decoder (733).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (730) may perform motion compensated predictive coding, which codes an input frame predictively with reference to one or more previously-coded frames from the video sequence that were designated as "reference frames." In this manner, the coding engine (732) codes differences between pixel blocks of an input frame and pixel blocks of reference frame(s) that may be selected as prediction reference(s) to the input frame.

The local video decoder (733) may decode coded video data of frames that may be designated as reference frames, based on symbols created by the source coder (730). Operations of the coding engine (732) may advantageously be lossy processes. When the coded video data may be decoded at a video decoder (not shown in FIG. 6), the reconstructed video sequence typically may be a replica of the source video sequence with some errors. The local video decoder (733) replicates decoding processes that may be performed by the video decoder on reference frames and may cause reconstructed reference frames to be stored in the reference picture cache (734). In this manner, the encoder (503) may store copies of reconstructed reference frames locally that have common content as the reconstructed reference frames that will be obtained by a far-end video decoder (absent transmission errors).

The predictor (735) may perform prediction searches for the coding engine (732). That is, for a new frame to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the video coder (730), including, for example, setting of parameters and subgroup parameters used for encoding the video data.

Output of all aforementioned functional units may be subjected to entropy coding in the entropy coder (745). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (740) may buffer the coded video sequence(s) as created by the entropy coder (745) to prepare it for transmission via a communication channel (760), which may be a hardware/software link to a storage device which would store the encoded video data. The transmitter (740) may merge coded video data from the video coder (730) with other data to be transmitted, for example, coded audio data and/or ancillary data streams (sources not shown).

The controller (750) may manage operation of the encoder (503). During coding, the controller (750) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (503) may perform coding operations according to a predetermined video coding technology or standard, such as ITU-T Rec. H.265. In its operation, the video coder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (740) may transmit additional data with the encoded video. The video coder (730) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In embodiments, the line index of the nearest reference line may be 0. The nearest reference line may be referred to as the zero reference line, and other lines may be referred to as non-zero reference lines. The maximum signaled reference line number may be denoted as N.

In embodiments, for non-zero reference lines, an intra mode index may be signaled from a mode list which is a subset of the zero reference line MPM list, or a secondary MPM list. Accordingly, modes which are not included in zero reference line MPM list may not be used for non-zero reference lines, and the reference line index may be signaled before the intra prediction mode.

In an embodiment, Planar and DC modes in zero reference line MPM list are excluded for the non-zero reference line mode list, and all other modes in zero reference line MPM list are used for non-zero reference lines.

In another embodiment, the mode list generation process of non-zero reference lines is the same as the zero reference line MPM list generation process except that Planar and DC modes are excluded from the mode list of non-zero reference lines.

In an embodiment, the size of the mode list in non-zero reference lines is 4 while the size of MPM list for zero reference line is 6.

In another embodiment, the size of the mode list in non-zero reference lines is 3 while the size of MPM list for zero reference line is 6.

In another embodiment, the signaling of mode index for non-zero reference lines mode list is the same with MPM index signaling for the zero reference line except that up to 3 bins are used to signal the mode index for non-zero reference lines whereas up to 5 bins are used to signal MPM index for zero reference line.

In another embodiment, the signaling of mode index for non-zero reference lines mode list is the same with MPM index signaling in zero line except that up to 2 bins are used to signal the mode index for non-zero reference lines whereas up to 5 bins are used to signal MPM index for zero reference line.

In another embodiment, Planar mode, DC mode and the mode with MPM index equal to 5 in zero reference line MPM list are excluded for non-zero reference lines.

FIG. 8 is a flowchart of an example process 800 for signaling an intra prediction mode used to encode a current block in an encoded video bitstream. In some implementations, one or more process blocks of FIG. 8 may be performed by decoder 510. In some implementations, one or more process blocks of FIG. 8 may be performed by another device or a group of devices separate from or including decoder 510, such as encoder 503.

As shown in FIG. 8, process 800 may include generating a first most probable mode (MPM) list corresponding to a zero reference line of the current block (block 810). The first MPM list may include a first plurality of intra prediction modes.

As further shown in FIG. 8, process 800 may include generating a second MPM list corresponding to one or more non-zero reference lines of the current block (block 820). The second MPM list may include a second plurality of intra prediction modes which may be a subset of the first plurality of intra prediction modes.

As further shown in FIG. 8, process 800 may include signalling a reference line index indicating a reference line used to encode the current block from among the zero reference line and the one or more non-zero reference lines (block 830).

As further shown in FIG. 8, process 800 may include determining whether the reference line index indicates that the reference line is the zero reference line (block 840). Based on the reference line index indicating that the reference line is the zero reference line, process 800 may then signal the intra mode index indicating the intra prediction mode from within the first MPM list (block 850). Based on the reference line index indicating that the reference line is one from among the one or more non-zero reference lines, process 800 may then signal the intra mode index indicating the intra prediction mode from within the second MPM list (block 850).

In an embodiment, the zero reference line may include a nearest reference line from among a plurality of reference lines of the current block.

In an embodiment, a planar intra prediction mode may be excluded from the second MPM list.

In an embodiment, a DC intra prediction mode may be excluded from the second MPM list.

In an embodiment, a planar intra prediction mode and a DC intra prediction mode may be excluded from the second MPM list.

In an embodiment, the second MPM list may be smaller than the first MPM list.

In an embodiment, a number of the first plurality of intra prediction modes may be six, and a number of the second plurality of intra prediction modes may be four.

In an embodiment, based on the reference line index indicating that the reference line is the zero reference line, the intra mode index may be signaled using a first number of bins, and based on the reference line index indicating that the reference line is the one from among the one or more non-zero reference lines, the intra mode index may be signaled using a second number of bins smaller than the first number of bins.

In an embodiment, the first number of bins may be 5, and the second number of bins may be 3.

In an embodiment, the reference line index may be signaled before the intra mode index.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 9 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 1204, joystick 905, microphone 906, scanner 907, camera 908.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 1204, or joystick 905, but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example universal serial bus (USB) ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 1200.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory (RAM) 946, internal mass storage such as internal non-user accessible hard drives, solid-state drives (SSDs), and the like 947, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 949. Architectures for a peripheral bus include peripheral component interconnect (PCI), USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of signaling an intra prediction mode used to encode a current block in an encoded video bitstream using at least one processor, the method comprising:
generating a first most probable mode (MPM) list corresponding to a zero reference line of the current block, wherein the first MPM list comprises a first plurality of intra prediction modes;
generating a second MPM list corresponding to one or more non-zero reference lines of the current block, wherein the second MPM list comprises a second plurality of intra prediction modes, the second plurality of intra prediction modes comprising a subset of the first plurality of intra prediction modes;
signaling a reference line index indicating a reference line used to encode the current block from among the zero reference line and the one or more non-zero reference lines, wherein the reference line index indicates whether the intra prediction mode from within the first MPM list is used or the intra prediction mode from the second MPM list is used; and
subsequent to signaling the reference line index, signaling an intra mode index indicating the intra prediction mode,
wherein, based on the reference line index indicating that the reference line is the zero reference line, the intra mode index indicates the intra prediction mode within the first MPM list and the intra mode index is signaled using 5 bins, and
wherein, based on the reference line index indicating that the reference line is one from among the one or more non-zero reference lines, the intra mode index indicates the intra prediction mode within the second MPM list and the intra mode index is signaled using 4 bins.

2. The method of claim 1, wherein the zero reference line comprises a nearest reference line from among a plurality of reference lines of the current block.

3. The method of claim 1, wherein the second MPM list is smaller than the first MPM list.

4. The method of claim 3, wherein a number of modes of the first MPM list is six, and a number of modes of the second MPM list is four.

5. The method of claim 1, wherein the reference line index is signaled before the intra mode index.

6. The method of claim 1, wherein the first MPM list includes at least one of a DC mode and a planar mode, and wherein the second MPM list includes all modes of the first MPM list except for the at least one of the DC mode and the planar mode.

7. A device for signaling an intra prediction mode used to encode a current block in an encoded video bitstream, the device comprising:
at least one memory configured to store program code; and
at least one processor configured to read the program code and operate as instructed by the program code, the program code including:
first generating code configured to cause the processor to generate a first most probable mode (MPM) list corresponding to a zero reference line of the current block, wherein the first MPM list comprises a first plurality of intra prediction modes;
second generating code configured to cause the processor to generate a second MPM list corresponding to one or more non-zero reference lines of the current block, wherein the second MPM list comprises a second plurality of intra prediction modes, the second plurality of intra prediction modes comprising a subset of the first plurality of intra prediction modes;
first signaling code configured to cause the processor to signal a reference line index indicating a reference line used to encode the current block from among the zero reference line and the one or more non-zero reference lines, wherein the reference line index indicates whether the intra prediction mode from within the first MPM list is used or the intra prediction mode from the second MPM list is used; and
second signaling code configured to cause the processor to, subsequent to signaling the reference line index, signal an intra mode index indicating the intra prediction mode,
wherein, based on the reference line index indicating that the reference line is the zero reference line, the intra mode index indicates the intra prediction mode within the first MPM list and the intra mode index is signaled using 5 bins, and
wherein, based on the reference line index indicating that the reference line is one from among the one or more non-zero reference lines, the intra mode index indicates the intra prediction mode within the second MPM list and the intra mode index is signaled using 4 bins.

8. The device of claim 7, wherein the zero reference line comprises a nearest reference line from among a plurality of reference lines of the current block.

9. The device of claim 7, wherein the second MPM list is smaller than the first MPM list.

10. The device of claim 9, wherein a number of modes of the first MPM list is six, and a number of modes of the second MPM list is four.

11. The device of claim 7, wherein the reference line index is signaled before the intra mode index.

12. The device of claim 7, wherein the first MPM list includes at least one of a DC mode and a planar mode, and wherein the second MPM list includes all modes of the first MPM list except for the at least one of the DC mode and the planar mode.

13. A non-transitory computer-readable medium storing instructions, the instructions comprising: one or more instructions that, when executed by one or more processors of a device for signaling an intra prediction mode used to encode a current block in an encoded video bitstream, cause the one or more processors to:
generate a first most probable mode (MPM) list corresponding to a zero reference line of the current block, wherein the first MPM list comprises a first plurality of intra prediction modes;
generate a second MPM list corresponding to one or more non-zero reference lines of the current block, wherein the second MPM list comprises a second plurality of intra prediction modes, the second plurality of intra prediction modes comprising a subset of the first plurality of intra prediction modes;

signal a reference line index indicating a reference line used to encode the current block from among the zero reference line and the one or more non-zero reference lines, wherein the reference line index indicates whether the intra prediction mode from within the first MPM list is used or the intra prediction mode from the second MPM list is used; and subsequent to signaling the reference line index, signal an intra mode index indicating the intra prediction mode, wherein, based on the reference line index indicating that the reference line is the zero reference line, the intra mode index indicates the intra prediction mode within the first MPM list and the intra mode index is signaled using 5 bins, and wherein, based on the reference line index indicating that the reference line is one from among the one or more non-zero reference lines, the intra mode index indicates the intra prediction mode within the second MPM list and the intra mode index is signaled using 4 bins.

14. The non-transitory computer-readable medium of claim 13, wherein the zero reference line comprises a nearest reference line from among a plurality of reference lines of the current block.

15. The non-transitory computer-readable medium of claim 13, wherein the second MPM list is smaller than the first MPM list.

16. The non-transitory computer-readable medium of claim 15, wherein a number of modes of the first MPM list is six, and a number of modes of the second MPM list is four.

17. The non-transitory computer-readable medium of claim 13, wherein the reference line index is signaled before the intra mode index.

* * * * *